(12) United States Patent
Ohno

(10) Patent No.: US 6,266,656 B1
(45) Date of Patent: Jul. 24, 2001

(54) CLASSIFICATION APPARATUS

(75) Inventor: Kazuhiko Ohno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/157,315

(22) Filed: Sep. 21, 1998

(30) Foreign Application Priority Data

Sep. 19, 1997 (JP) .................................................. 9-273797

(51) Int. Cl.⁷ .................................................. G06E 1/00

(52) U.S. Cl. .................................. 706/20; 706/47; 706/61

(58) Field of Search ................................. 706/20, 47, 61, 706/48, 62, 58

(56) References Cited

U.S. PATENT DOCUMENTS

| | | | |
|---|---|---|---|
| 4,908,778 | 3/1990 | Moriyasu et al. | 364/513 |
| 5,140,670 | * 8/1992 | Chua et al. | 706/29 |
| 5,325,445 | 6/1994 | Herbert | 382/225 |
| 5,361,379 | * 11/1994 | White | 382/227 |
| 5,649,070 | * 7/1997 | Connell et al. | 706/14 |
| 5,719,692 | * 2/1998 | Cohen | 706/47 |
| 5,720,009 | * 2/1998 | Kirk et al. | 706/47 |
| 5,727,199 | 3/1998 | Chen et al. | 707/6 |
| 5,729,452 | 3/1998 | Smith et al. | 701/29 |
| 5,761,389 | 6/1998 | Maeda et al. | 706/59 |
| 5,809,499 | 9/1998 | Wong et al. | 707/6 |
| 5,819,007 | * 10/1998 | Elghazzawi | 706/46 |
| 5,949,902 | 9/1999 | Oberlander | 382/159 |
| 6,092,059 | * 7/2000 | Straforini et al. | 706/14 |

FOREIGN PATENT DOCUMENTS

| | | |
|---|---|---|
| 5-35484 | 2/1993 | (JP) . |
| 6-44206 | 2/1994 | (JP) . |
| 7-43722 | 5/1995 | (JP) . |

OTHER PUBLICATIONS

S. Tsumoto et al., "Extraction of Domain Knowledge from Database Based on Rough Set Theory," Proceedings of the Fifth IEEE International Conference on Fuzzy Systems, 1996, vol. 2, pp. 748–754, Sep. 1996.

K.C.C. Chan, "A Probabilistic inductive Learning Approach to the Acquisition of Knowledge in Medical Expert Systems," Proceedings of the Fifth Annual IEEE Symposium on Computer–Based Medical Systems, 1992, pp. 572–581, Jun. 1992.

Article –"Journal of Japanese Society for Artificial Association", vol. 11 No. 2, (1996), pp. 264–272.

(List continued on next page.)

Primary Examiner—Mark Powell
Assistant Examiner—Anil Khatri
(74) Attorney, Agent, or Firm—Foley & Lardner

(57) ABSTRACT

A classification apparatus for performing effective learning type automatic classification for realistic problems of classification. The apparatus includes input unit for entering the known case data and the unknown case data, a classification ruled database for storing classification rules including the probabilistic information, a case database for storing the known case data in the form of a network based on the logical relation of conditional parts, a probability value estimating unit for estimating probability values of the results of classification using the conditional parts of the known case data and the unknown case data as entered and the rules of classification and a classification rule generating unit for evaluating the validity of the classification rules by statistic verification for suppressing generation of useless classification rules, and a negative condition searching unit for receiving all or part of the conditional parts of the known case data as entered. The classification rule generating unit has an added function of generating a classification rule including the negative condition using the negative condition searching unit.

7 Claims, 9 Drawing Sheets

OTHER PUBLICATIONS

Article –"Journal of the Data Processing Association", vol. 33 No. 5, (1992), pp. 636–644.

Lugosi et al., "On the posterior probability estimate of the error rate of nonparametric classification rules", IEEE Tran. on information theory, vo. 40, No. 2, pp 475–481, Mar. 1994.*

Rose et al., "Hierarchical classification as an aid to database and hit list browsing", CIKM ACM, pp 408–414, Mar. 1994.*

Eick et al., "Learning bayesian classification rules through genetic algorithm", CIKM ACM pp 305–313, Mar. 1993.*

Li et al, "Text classification using ECS based stochastic decision list", CIKM ACM pp 122–130, Jan. 1999.*

* cited by examiner

CLASSIFICATION APPARATUS

TECHNICAL FIELD OF THE INVENTION

This invention relates to a classification apparatus for automatically generating a classification rule using pre-classified case (or event) data for automatically classifying unclassified cases.

BACKGROUND OF THE INVENTION

As the methods for automatically generating classification rules from the pre-classified events for classification using this generated rule, a wide variety of methods have hitherto been proposed, such as a statistic method, techniques of knowledge-based processing, techniques based on computational learning theories or neural-net-like techniques. These techniques have their merits and demerits and the suitable area differs problem to problem.

The statistic techniques are principally aimed at analyzing event data based on probabilistic models and hence are used for finding out the main tendency latent in the event data. The volume of processing necessary for rule generation is also small. On the other hand, the statistic techniques are not good at exceptional classifying processing operations. The statistic techniques may be exemplified by quantitation II and Bayesian decision.

The techniques of knowledge-based processing and the computational learning theory are the technique and the theory proposed in the course of researches towards realization of the mechanical learning. Stated briefly, the mechanical learning means autonomous generation by a computer of the adaptive knowledge (information, rules or program etc.). The automatic classification may be classed as a part of this mechanical learning function. While the main object of the statistic technique is discovery of the main tendency of event data, the ultimate object of the mechanical learning is increasing the intelligence of the computer, and hence the object is diversified. The object of the mechanical learning differs slightly from one group of researchers to another. For example, the object of the mechanical learning encompasses finding the extent of hypotheses not in contradiction to the events, recognition and processing of event data behaving exceptionally, or automatic generation of event-generating programs etc.

The neural network type technique is a pseudo-system employing pseudo neural cells and can be applied to learning or pattern recognition. Although the technique can be used easily, the classification rule represents a black-box such that the technique is difficult to be checked or corrected by an operator.

In the following, attention is directed to an inductive inference apparatus (JP Patent Kokoku JP-B-07-43722 or U.S. Pat. No. 4,908,778). This JP Patent Kokoku JP-B-07-43722 is aimed at inductively finding a general knowledge for an event, which comes into being by combining various conditions, from events of the pertinent field in order to acquire the knowledge information required for knowledge processing effectively.

This inductive inference apparatus is fed with a set of case data and subsequently generates a sufficient condition and a necessary condition for realization of respective results of classification. Using these conditions, if an unknown condition is given and the sufficient condition is met, the result of classification is decided to hold (true), whereas, if the unknown condition is given and the necessary condition is not met, the result of classification is judged not to hold.

PROBLEM TO BE SOLVED BY THE INVENTION

In the course of eager investigation toward the present invention, the following problem has been encountered.

This technique has a drawback that, if the set of case data cannot be classified logically, it is impossible to generate any valid classification rule. Suppose that the following case data are given:

TABLE 1

| cases | results of classification | conditions |
|---|---|---|
| Sardine | fish | live in water |
| Salmon | fish | live in water |
| Sea bream | fish | live in water |
| Dolphin | animal | live in water |

It is now assumed that, after generation of a classification rule from the above case data, the following case data:

TABLE 2

| Cases | Results of classification | conditions |
|---|---|---|
| Carp | ? | live in water | the results of classification of which are unknown are classified.

The condition "live in water" is not a sufficient condition to derive the classification result "fish" and hence the carp cannot be classified as fish. On the other hand, since "live in water" is a necessary condition for "fish", the fact that the carp is fish cannot be negated. In short, no positive classification rule can be generated concerning the "live in water" and "fish" from the set of event data aforementioned. These circumstances hold for "animals" as well.

Although the above is logically a matter of course, the following problems are raised in connection with realistic application.

The first problem is that case data that cannot be classified logically are frequently given in realistic application.

The second problem is that the above-described inductive inference apparatus cannot be said to sufficiently exploit the information of the case data. For example, it is desirable that, in case where the majority of cases of the sub-aquatic life is "fish", and, if these cases are given to the system as case data for learning, a classification rule stating: "although not fully positive, the sub-aquatic life is possibly the fish" is desirably produced. It is also important in this case that the degree of certainty is varied quantitatively.

SUMMARY OF THE DISCLOSURE

In light of the above-mentioned inductive inference apparatus, the problem to be solved by the present invention is:

generating a classification rule quantitatively including the degree of certainty for input of case (or event) data that cannot be classified logically, and classifying the unknown case (or event) with quantitative values representing the degree of certainty using the generated classification rule.

In generic terms, it is an object of the present invention is to provide an apparatus performing effective learning type automatic classification for realistic classification problems.

The realistic classification problems herein mean such a problem containing cases (or events) that cannot be classified logically as described above and encompassing a wide variety of sorts of the conditions or results of classification.

The effective classification of these realistic classification problems means i) generating a classification rule effective for classification within realistic time and computational resources; and ii) outputting the results of classification with quantitative values representing the degree of certainty.

For accomplishing the above object, the present invention resides in introducing a probability value into a classification rule as a quantitative value of certainty, generates the classification rule having the probability value using cases and performs reliable classification using the classification rule.

More specifically, the present invention provides a classification apparatus in which classification rules are automatically generated using known case data, having known results of classification, among case data each of which is made up of a set of a conditional part serving as a clue for classification and a result of classification, and in which unknown case data, having unknown results of classification, are automatically classified using classification rules. The classification apparatus includes an input unit for entering the known case data and the unknown case data, a classification ruled database for storing classification rules including the probabilistic information, a case database for storing the known case data in the form of a network based on the logical relation of the conditional parts, a probability value estimating unit for estimating probability values of the results of classification using the conditional parts of the known case data and the unknown case data as entered and the rules of classification, and a classification rule generating unit for evaluating the validity of the classification rules by statistic verification for suppressing generation of useless classification rules.

Preferably, the probability value of the result of classification of known case data entered from input unit is compared to the probability value of the result of classification output by probability value estimating unit for generating the classification rule if the difference exceeds a predetermined value. (aspect 2)

Preferably, the classification rule generating apparatus further includes negative condition searching means for receiving all or part of the conditional parts of the known case data as entered for searching in the case database for estimating the case nodes which include the negative conditions, and classification rule generating means having an added function of generating a classification rule including the negative condition using the negative condition searching means.

As first means, the present invention judges validity of a classification rule when it is generated to inhibit generation of a useless classification rule (aspect 1).

As second means, the present invention searches in the case database formed in a network based on the logical relation of conditions in order to find negative conditions to generate a classification rule having a negative condition (aspect 3).

According to the present invention, the total volume of the recording device necessary for storage of the classification rule can be reduced to shorten the processing time involved in utilization and actuation of the classification rule. This is effective in solving the realistic problem.

By the second means, the negative conditions can be retrieved in a shorter time than is required in retrieving the cases in their entirety to enable efficient generation of the classification rules having negative conditions. The classification rule leads to improved accuracy in automatic classification.

BASIC CONCEPT OF THE INVENTION

Before proceeding to description of preferred embodiments of the present invention, the principle underlying the present invention is explained.

The present invention is characterized by automatically generating the classification rule from case data. Based on probabilistic and statistic concept underlying this processing, case data, population and the classification rule are explained.

Case data: first, the term "case data" is defined.

The case data represent a pair of a conditional part and results of classification. In general, the conditional part is constituted by logic product (multiplication) of plural conditions. These conditions are those which hold in connection with the case data. The conditions which hold are not included in the conditional part. An example of the conditional part is:

$$\text{live in water} \wedge \text{respiration with gills} \wedge \text{have scales} \quad (1)$$

where the symbol $\wedge$ represents the logic product. In the above example, this symbol indicates that all conditions of "live in water", "respiration with gills" and "have scales" are met.

The results of classification represent a discrete symbol. The following is an example of results of classification: Fish.

A pair of a conditional part and result of classification make up case data. Although not essential, case names are occasionally added (annexed) for explanation. The following shows an example of the case data:

TABLE 3

| names of cases | Results of Classification | conditional part |
|---|---|---|
| sardine 1 | fish | live in water∧respiration with gills∧have scales |

This case data, which lives in water, makes respiration with gills and has scales, is classified as fish, and is termed "sardine 1".

<Set of Case Data>

A group of case data, entered up to a certain time point, is termed a set of case data. In the following, examples of sets of case data are shown:

TABLE 4

| Names of cases | results of classification | conditional part |
|---|---|---|
| sardine 3 | fish | Live in∧water respiration with gills |
| salmon 1 | fish | live in water∧respiration with gills∧ the case goes upstream for spawning |
| bear 1 | animal | live on land∧pulmonary respiration |
| sardine 2 | fish | live in water∧respiration with gills∧small size |

<Probability with which Case Data are Observed>

It is thought, by way of assumption, that case data are accompanied by a probability value with which the case data are observed. This probability value of observation usually assumes a real number value not less than 0 and not larger than 1, with the sum of probability values of all case data being unity. The probability value of observation is occasionally termed 'measure'.

The set of case data inclusive of the probability values is termed "population". The following is an example of the population:

TABLE 5

| names of cases | probability of observation | Results of Classification | Conditional part |
|---|---|---|---|
| Sardine 3 | 0.3 | fish | live in water∧respiration with gills |
| Salmon 1 | 0.2 | fish | live in water∧respiration with gills∧ the case goes upstream for spawning |
| bear 1 | 0.1 | animal | live on land∧pulmonary respiration |
| sardine 2 | 0.4 | fish | live in water∧respiration with gills∧ small size |

It is assumed that the case data occur in accordance with the probability of observation of the population. That is, if sole case data is observed from the population of Table 1, the probability that this case data is as shown in Table 6 is 0.1.

TABLE 6

| Names of cases | Results of classification | Conditional part |
|---|---|---|
| Bear 1 | animal | Live on land∧pulmonary respiration |

<Conditional Probability of the Results of Classification>

If, in the case data, a condition C holds, provided that the following is met:
1. The affirmative conditions for the condition C are all included in the conditional part of the case data; and
2. none of the negative conditions for the condition C are included in the conditional part of the case data.

If, in the case data, a result of classification R holds under the condition C, the condition C holds for the case data, with the result of classification being R.

If the population is set, the conditional probability p (R|C) of the results of classification R under the condition C is defined by the following equation (2):

$$Cp(R\mid C) = \frac{\text{probability of observation of all case data for which } R \text{ holds under } C}{\text{probability of observation of all case data for which } C \text{ holds}} \quad (2)$$

This is also termed the conditional probability (probability with condition) of the results of classification.

For example, with the population of Table 5, $$p(\text{fish}\mid\text{live in water})=1.0 \quad (3)$$

If all of the conditional probability values of the results of classification under the combination of all conditions present in the population can be found correctly, the processing of generation of the classification rule is completed with success. However, this practically is not so easy. For correctly finding the values of the conditional probability, a large quantity of case data are required. Then, if there are n conditional elements, the total number of the combinations of conditions is $2^n-1$, meaning that an extremely large number of conditional probability values need to be processed.

Therefore, in the present invention, conditional probability values with high statistic reliability are preferentially used to generate the classification rule.

In the present invention, case data are entered one-by-one, and the case data base updating and generation/correction of the classification rule are performed each time new case data is entered. The processing of generating and correcting the classification rule is termed "classification rule generation processing" (CRGP). In the classification rule generation processing, the entered sole case data plays a key role. This case data is termed in particular an "inductive case".

It is an objective of the classification rule generation processing to formulate the probabilistic relation between the condition of a given set of case data and the results of classification as a classification rule. Therefore, it is an objective of the classification rule generation processing to generate, using the conditional part as a clue for classification, such a classification rule for an inductive case which will lead the probability value of the results of classification to a higher value and which also will lead the probability value of the results of classification contrary to the results of classification of the inductive case to a lower value.

<Frequency of Inductive Data>

The input inductive cases are stored in a case data base. The frequency of the case data is determined in association with previously entered case data. This frequency usually assumes a real number value not less than 0. On the case data base is formulated the following table. However, its substance is not a mere table but a network explained later on.

TABLE 7

| Names of Cases | Frequency | Results of classification | Conditional part |
|---|---|---|---|
| Sardine 3 | 1 | Fish | live in water∧respiration with gills |
| Salmon 1 | 2 | fish | live in water∧the case goes upstream for spawning |
| Bear 1 | 1 | animal | live on land∧pulmonary respiration |
| Sardine 2 | 2 | fish | live in water∧small size |

[Classification Rule]

The classification rule is made up of a conditional part C, results of classification R, an estimated value of the conditional probability p(R|C) under which the results of classification R hold under the conditional part C, and the frequency of the conditional part.

Example of Classification Rule
Classification Rule

TABLE 8

| Rule number | Results of Classification | condition part | probability value | frequency of conditional part |
|---|---|---|---|---|
| R1 | fish ← | live in water | 0.86 | 5 |

For explaining the two values of the classification rule, that are the estimated value of the conditional probability (probability value in the example) and the frequency of the conditional part (frequency of the conditional part and the frequency of the rule being valid termed as "rule holding frequency") are defined.

<Frequency of Conditional Part>

With the conditional part C of a classification rule r and that of the case data D, the sum of the frequencies of all case data for which C holds under D is termed the frequency of the conditional part of the classification rule r.

Example

Case Example Data Base is as Shown in Table 9:

TABLE 9

| names of cases | frequency | Results of Classi- fiation | conditional part |
|---|---|---|---|
| sardine 3 | 1 | Fish | live in water∧respiration with gills |
| salmon 1 | 2 | Fish | live in water∧the case goes upstream for spawning |
| bear 1 | 1 | Animal | live on land∧pulmonary respiration |
| sardine 2 | 2 | Fish | live in water∧small size |

The frequency of the conditional part of the classification rule as shown in Table 10 is 5 because there are five cases of living in water. The frequency of the conditional part is irrelevant to the results of classification ("animal" in the above example).

TABLE 10

| rule number | Results of classification | condition part |
|---|---|---|
| R2 | Animal ← | live in water |

<Rule Holding Frequency>

The sum of frequencies of all case data for which C holds (is true) under D and $$R = S \quad (4)$$

where C is the conditional part of a classification rule r, R is its results of classification, D is the conditional part of case data and S is its results of classification, is termed the frequency with which the rule of r holds ("rule holding frequency").

In the present invention, the following Laplacian equation of estimation is used as an estimated value of the conditional probability:

$$p(R | C) = \frac{\text{number of cases for which both } R \text{ and } C \text{ hold(rule holding frequency)} + t}{\text{frequency of conditional part of } C + n} \quad (5)$$

Although there are variations with t=1, n=2 or t=0.5, n=1, the equation with t=1 and n=2 is used, unless otherwise specified. As for the conditional probability of the classification rule, an ideal conditional probability, as determined by the population defined by the equation (2), is estimated from the set of case data.

By generating a probabilistic classification rule using case data, and by estimating the probability value in the course of automatic classification, the results of classification can be given probability values as quantitative values of certainty.

It may be an occurrence that generation of the classification rule containing negative conditions at the time of generation of the classification rule is effective for improving the accuracy in classification. Assume that the following set of cases as shown in Table 11 is given (it being assumed that the case sets enumerated above as examples are disregarded and only this case set is given).

TABLE 11

| cases | Results of classifica- tion | conditional part |
|---|---|---|
| humpback whale | Animal | live in water∧pulmonary respiration |
| dolphin | Animal | live in water∧pulmonary respiration |
| sperm whale | Animal | live in water∧pulmonary respiration |
| trout | Fish | live in water |
| sardine | Fish | live in water |

In the above table ∧ is a symbol denoting a logic product.

If, from the classification rules generated from the above cases, only those not containing the negative conditions are stated, the following Table 12 is obtained (the probability values being calculated from the Laplacian equation of estimation).

TABLE 12

| rule number | Results Classification | condition part | Probability value | Frequency of Conditional part |
|---|---|---|---|---|
| R1 | Animal← | live in water | 0.57 | 5 |
| R2 | Animal← | live in water∧ pulmonary respiration | 0.8 | 3 |
| R3 | fish← | live in water | 0.43 | 5 |
| R4 | fish← | live in water∧ pulmonary respiration | 0.2 | 3 |

If, using this classification rule, the condition="live in water" as a problem of classification is solved, the result of classification is "animal" as rank 1, with a probability value of 0.57 and "fish" as rank 2, with a probability value of 0.43. This is in error and correct result of classification should read "fish" as rank 1 and "animal" as rank 2.

The rule of classification with a negative condition is stated here.

TABLE 13

| rule number | Results of Classification | conditional part | Probability Value | Frequency of conditional part |
|---|---|---|---|---|
| R5 | Animal← | live in water∧ ]pulmonary respiration | 0.33 | 3 |
| R6 | fish← | live in water∧ ]pulmonary respiration | 0.67 | 3 |

] is a symbol which means negation and "] pulmonary respiration" means that the condition "pulmonary respiration" is lacking.

If, using this classification rule, the condition="live in water" as a problem of classification is solved, the result of classification is "fish" as rank 1, with a probability value of 0.67 and "animal" as rank 2, with a probability value of 0.33. Thus, the result of classification of the correct ranking is obtained.

As described above, generation of the classification rule with negative conditions, which is effective in improving precision in classification, is not so easy as the classification rule without negative conditions. The reason is that the classification rule without negative conditions can be generated by combining the conditions of inductive cases, whereas, with the classification rule with negative conditions, the negative conditions are not included in the conditions of the inductive cases such that it is necessary to make search from a set of past cases. In the following, the concept underlying the present invention is first explained, followed by the method for generating the classification rule without negative conditions and the method for generating the classification rule with negative conditions, in this order.

The meritorious effects of the present invention are briefly stated as follows.

According to the present invention, as described above, there are provided means for judging validity of a classification rule at the time of its generation for inhibiting generation of the wasteful classification rules, and means for retrieving a case database formed into a network based on the logical relation of the conditions in order to find negative conditions to generate the classification rule having negative conditions. By the first-stated means, the total volume of the recording medium necessary for storage of the classification can be decreased, at the same time that the processing time for utilization and operation of the classification rule can be reduced. This is effective for solving the practical problems.

Also, according to the present invention, the negative conditions can be retrieved in a shorter processing time than that required for retrieving all cases, while the classification rule having the negative condition can be generated efficiently. The classification rule having the negative condition contributes to improved accuracy in automatic classification.

DESCRIPTION OF THE PREFERRED EMBODIMENTS

Figure 1:
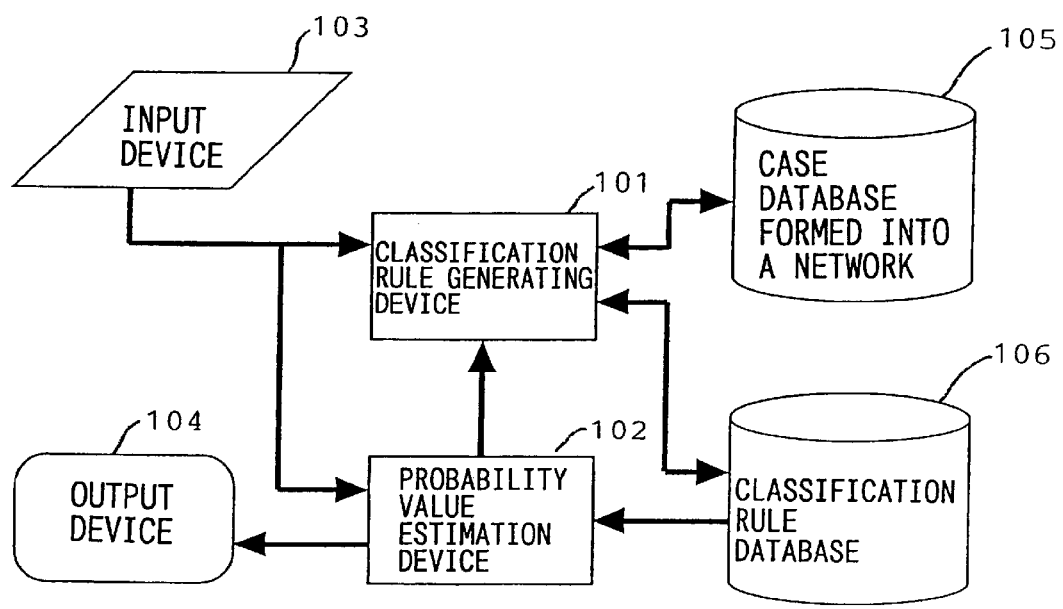
FIG. 1 is a block diagram showing a structure of an embodiment of the present invention.

Referring to the drawings, preferred embodiments of the present invention will be explained in detail.

Figure 2:
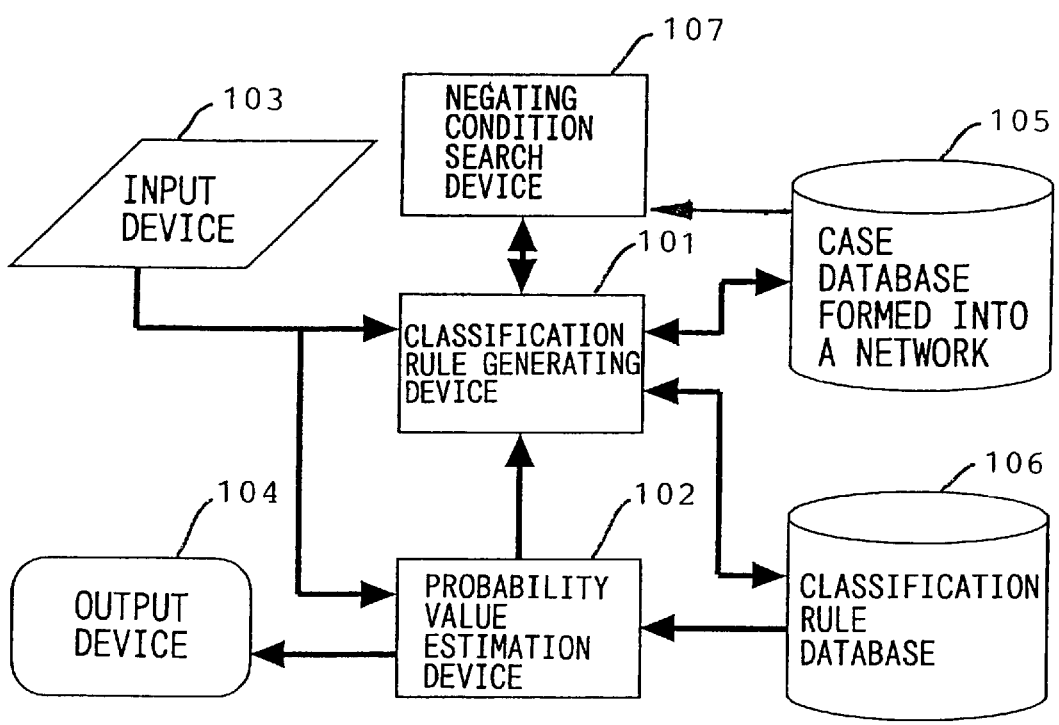
FIG. 2 is a block diagram showing a structure of another embodiment of the present invention.
Figure 3:
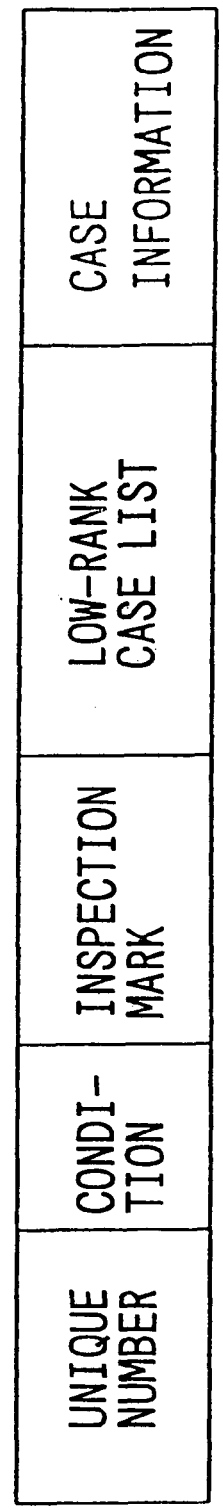
FIG. 3 is a conceptualized view for illustrating the embodiments of the present invention.

FIGS. 1 and 2 are block diagrams showing a structure of a classification apparatus embodying the present invention. FIGS. 1 and 2 correspond to an embodiment of aspect 1 and an embodiment of aspect 3, respectively. In the following, the processing sequence for generating the classification rule and that for classification are explained with reference to FIG. 2 The difference of this processing sequence from a processing sequence of FIG. 1 is explained subsequently.

Referring to FIG. 1, the present embodiment includes an input device 103 for entering known case data and unknown case data, and a classification rule database 106 for storage of the classification rules containing the probabilistic information. The present embodiment also includes a case database 105 for forming and storing the known case data into a network based on the logical relation of the conditional parts and a probability value estimation device 102 for estimating the probability value of the results of classification using the conditional parts of the input known case data and unknown case data and the above-mentioned classification rule. The present embodiment further includes a classification (CLS) rule generating device 101 for evaluating the validity of the classification rule by statistic verification to suppress wasteful generation of the classification rule, and an output device 104.

Referring to FIG. 2, the structure of FIG. 2 corresponds to the structure of FIG. 1 added thereto with a negative condition search device 107. The negative condition search device 107 has a function of accepting all or part of the conditional parts of the input known case data as input and searching in the case database in order to infer case nodes including the negative condition. The classification rule generating device 101 has a function of generating the classification rule having a negative conditions using the negative condition search device 107.

<Processing Sequence upon Generating the Classification Rule>

Step 1: A sole case data having known result of classification is supplied from an input device and sent to the classification rule generating device 101 and to the probability value estimation device 102. Since this case data performs a role different from other cases in the subsequent processing, the case data is referred to herein as "inductive case".

Step 2: The classification rule generating device 101 adds inductive case(s) to the case database 105 for registration.

Step 3: The probability value estimation device 102 finds the results of classification and probability values thereof using the conditions of the inductive cases and the classification rule database 106.

Step 4: If the results of classification are not correct, processing transfers to step 5 in order to generate the classification rule. If the results of classification are correct, processing branches to step 9.

Step 5: The classification rule generating device 101 first attempts to generate the classification rule not containing the negative condition. If the classification rule not containing the negative condition could be generated successfully, processing branches to step 9.

Step 6: The classification rule generating device 101 sends search conditions to the negative condition search device 107.

Step 7: The negative condition search device 107 searches the case database 105 in order to find negative conditions suited to the searching conditions to transfer the negative conditions thus found to the classification rule generating device 101.

Step 8: The classification rule generating device 101 generates the classification rule having the negative condition to add the generated classification rule to the classification rule database 106.

Step 9: If there is the next case data, processing reverts to step 1 and, otherwise, processing is terminated.

Since the classification device shown in FIG. 1 is lacking in the negative condition search device 107, the processing operations of steps 6 to 8 are omitted.

<Processing Sequence upon of Automatic Processing>

Step 1: An input of case data, the results of classification of which are unknown, is accepted from the input device 103, and is transferred to the probability value estimation device 102.

Step 2: The probability value estimation device 102 finds the results of classification and probability values thereof using the condition of the case data and the classification rule database.

Step 3: If there is the next case data, processing reverts to step 1 and, otherwise, processing is terminated.

The same applies for the classification device of FIG. 1.

<Method for Generating Classification Rule without Negative Condition>

As a principle, the classification rule without the negative condition can be generated by combining the conditions of the case.

Example

TABLE 14

| cases | results of classification | Conditional part |
|---|---|---|
| Humpback whale | Animal | live in water∧pulmonary respiration∧gigantic |

For the example as shown in Table 14, the following classification rule can be generated:

TABLE 15

| rule number | results of classification | condition part | probability value and frequency of conditional part omitted |
|---|---|---|---|
| R1 | animal← | live in water | |
| R7 | animal← | pulmonary respiration | |
| R9 | animal← | gigantic | |
| R2 | animal← | live in water∧pulmonary respiration | |
| R8 | animal← | pulmonary respiration∧gigantic | |
| R10 | animal← | gigantic∧live in water | |
| R11 | animal← | live in water∧pulmonary respiration∧gigantic | |

However, if all classification rues are generated, the total number of rules is increased drastically. Therefore, in actual application, control needs to be performed so that only useful classification rules will be generated. If the number of conditions of the case is n, the number of the classification rules that can be generated is equal to the total number of the combinations $2^n-1$. For example, if n=10, the number of the classification rules is 1023. Since this number is drastically increased with increase in n, means must be provided to generate only useful classification rules.

In the present invention, the following two means are used for generating only useful classification rules.

1. As the first means, validity of the classification rules is judged by statistic verification. This corresponds to the first aspect.
2. As the second means, if the inductive cases could be classified successfully, no new classification rule is generated. This corresponds to the second aspect.

In the following, the procedure for judging validity of the classification rule by statistic verification is explained.

<Validity of the Classification Rule>

Conceptually, the validity of the classification rule is defined as follows:

1. If, with the results of classification R and the conditional part C of the classification rules r, the conditional probability $p\sim(R|C)$ assumes a value close to the conditional probability determined from the population $p(R|C)$, and
2. if the ability of any one classification of the classification system before addition to the classification rule base of the classification rule r differs significantly from that after the addition (i.e., the latter is significantly enhanced);

the classification rule r is judged to be valid.

The first condition is met to some extent by employing the Laplacian equation of estimation (5) for the estimation of the conditional probability $p(R|C)$. The method for judging the second condition is now explained. In this judgment, it is crucial whether or not the classification rule to be added can be derived from the pre-existing classification rule base.

<Procedure for Judging Rule Validity>

Step 1: An inductive case (or cases) is added to the case database.

Step 2: Using the case database, the frequency of the conditional part of the classification rule of the subject of validity judgment and the frequency of the holding (valid) of the rule are obtained. In the following, the classification rule of the subject of judgment of validity is termed a "classification rule concerned".

Step 3: Using the existing classification rule base, automatic classification is made with the conditional part C of the classification rule concerned as a clue (key) for classification, as a result of which an estimated value $p\sim(R|C)$ of the conditional probability of the results of classification on the classification rule concerned is obtained.

Step 4: The probability q of occurrence of an unusual state equal to or exceeding the frequency of the conditional part and the rule holding frequency under the estimated value of the conditional probability $p\sim(R|C)$ is calculated.

Step 5: If the probability q is less than a pre-set level of significance, it is seen that the classification rule can be naturally derived from the existing classification rule base. Thus, the classification rule is judged to be invalid.

Conversely, if q is equal to or higher than a pre-set level of significance, it is seen that the classification rule is a special one that cannot be naturally derived from the existing classification rule base. Thus, the classification rule is judged to be valid.

Example

As a classification rule of the validity judgment subject is set as in Table 16:

TABLE 16

| Rule Number | results of classification | condition part |
|---|---|---|
| R2 | animal ← | live in water ∧ pulmonary respiration |

First, using the existing classification rule base, the conditional probability p(animal|live in water ^ pulmonary respiration)

is estimated. To this end, a set of classification rules which hold under conditional part(live in water ^ pulmonary respiration )

is found.

Example

TABLE 17

| rule number | results of classification | conditional part | probability value | Frequency of conditional part |
|---|---|---|---|---|
| R1 | animal← | live in water | 0.05 | 105 |
| R7 | animal← | pulmonary respiration | 0.90 | 18 |

Using the probability values of the classification rules of Table 17, the conditional probability $$p(\text{animal}|\text{live in water} \wedge \text{pulmonary respiration})$$

is estimated. There are several methods for estimation. As an example, a probabilistic inferring device, as described in the JP Patent Kokai JP-A-7-20545, is recited.

Although not explained in detail, it is assumed that an estimated value $$p(\text{conditional probability } p(\text{animal}|\text{live in water} \wedge \text{pulmonary respiration}))$$

of the probability of appearance of an "animal" under the clue of classification $$\text{"live in water} \wedge \text{pulmonary respiration"}$$

using the existing classification rule base and estimation means is found to be 0.2.

It is also assumed that the frequency of the classification rule as obtained from the case database is such that frequency of the conditional part=10 and rule-holding frequency=9.

At this time, the probability q of occurrence of an unusual state with a frequency higher than a frequency found from the case database is:

$$q = {}_{10}C_9*(1-p)*p^9 + p^{10} = 10*0.8*0.2^9 + 0.2^{10} = 0.0000042$$

which is an extremely low value.

If this probability value is smaller than a pre-set level of significance (such as 0.05 or 0.1), the classification rule to be generated is judged to differ from the existing classification rule. Since this indicates that the classification rule to be generated is valid, a probability value is found using the Laplacian equation of estimation (5) and added to the classification rule database. Since this indicates that the classification rule to be generated is valid, the probability value is found using the Laplacian equation of estimation and added to the classification rule base. The added classification rule is as follows:

TABLE 18

| rule number | results of classification | conditional part | Probability value | Frequency of Conditional part |
| --- | --- | --- | --- | --- |
| R2 | animal ← | live in water ∧ pulmonary respiration | 0.83 | 10 |

On the other hand, if the probability value is larger than a pre-set level of significance (0.05 or 0.1 etc.), the classification rule to be generated cannot be judged to be valid and hence is not added to the classification rule. Meanwhile, the level of significance is a threshold value used in the statistic test (verification) and is a probability value of erroneously rejecting a null hypothesis. Namely, in judgment of validity of the classification rule, the level of significance is the probability of generating invalid classification rules.

In the foregoing, a statistic method of computing the probability value q for comparison with the level of significance is shown by way of conceptual explanation. There are, however, a wide variety of methods used for the statistic test (verification). In the present invention, all of the applicable statistic testing systems are used without limitation to the above-described probabilistic calculation method.

<Procedure of Generating Classification Rule with Negative Condition>

The classification rule with appropriate negative condition improves the classification accuracy, as described above. In the following explanation of the procedure of the generating the classification rule with the negative condition, search (retrieval) in the case database is performed without waste for reducing the computational time and load imposed on a memory device. This corresponds to the third aspect.

In the procedure of generating the classification rule with negative condition the following steps are executed;

Step 1; the negative condition to be added is retrieved from the case database, and the classification rule is generated;

Step 2; statistic test (verification) is made to judge validity of the classification rule; and Step 3; the classification rule(s) found to be valid is(are) added to the classification rule database.

In retrieving the negative condition, the condition which can serve as the negative condition is retrieved, as the case database is searched in the order from a simpler condition to a more complex condition. It is noted that the case database constitutes a network which is based on the logical relation of the conditions. This achieves shortening of the retrieval time. Judgment as to validity of the classification rule by statistic test is similar to the instance devoid of the negative condition.

Before explaining the retrieval of the negative conditions, the structure of the case database is explained. The case database is made up of constituent elements termed case nodes which are constituted by unique number, condition, inspection mark, low-rank(order) case list and the case information. The meanings of these case nodes are as follows:

Unique number: Number uniquely identifying a case node.

Condition: Records the conditional part of the case node.

Inspection mark: Record whether or not, in the processing of retrieval of negative conditions, a given case node has already been processed.

Low-rank Case List: Lists recording low-rank code nodes. The meaning of the "low-rank case nodes" will be discussed subsequently.

Case Information: records as to which records of classification have occurred how many number of times under the conditions of case nodes.

Low-rank Case Nodes

If the conditional part of the case node E is C, a set of case nodes including all of the conditions of the conditional part C is S. In the set S, case node(s) not completely having the conditions of other cases, that is the case node(s) having the simplest conditional part, is termed the "low-rank case node(s)" or "low-rank node(s)". There may be plural low-rank case nodes.

Example

If the case nodes and the conditional part thereof are as shown in the following Table:

TABLE 19

| case number | conditional part |
| --- | --- |
| E0 | live in water |
| E1 | live in water ∧ respiration with gills |
| E2 | live in water ∧ fin |
| E3 | respiration with gills |
| E4 | live in water ∧ respiration with gills ∧ fin | the low-rank case nodes of E0 are E1 and E2. E4 is not a low-rank case node of E0.

Examples of Case Information

A set of cases shown in Table 20 corresponds to a case node shown in table 21:

TABLE 20

| Cases | results of classification | conditional part |
|---|---|---|
| Humpback whale | animal | live in water |
| Dolphin | animal | live in water |
| sperm whale | animal | live in water |
| trout | fish | live in water |
| sardine | fish | live in water |

TABLE 21

| unique number | Conditional part | inspection number | low-rank case list | Case information |
|---|---|---|---|---|
| E1 | Live in water | not inspected | none | animal(3), fish(2) |

This case information records that there exist three cases of the results of classification "animal" and two cases of the results of classification "fish" for the condition "live in water".

Co-Rank Node

A given case node sometimes has plural low-rank case nodes. These low-rank case nodes are termed "co-rank case nodes" or "co-rank node" relative to one another.

Higher-rank Case Node

A case node F, which has a given case node as a low-rank node, is termed an "higher-rank case node" or a "higher-rank node" when viewed from the rank of E.

For achieving efficient fast case retrieval, the case database 105 generates, from one individual condition to another, a list of case nodes termed a research entry point.

Search Entry Point

There exists a sole search entry point for one condition. The search entry point is constituted by a list of simplest case nodes including this condition.

Figure 4:
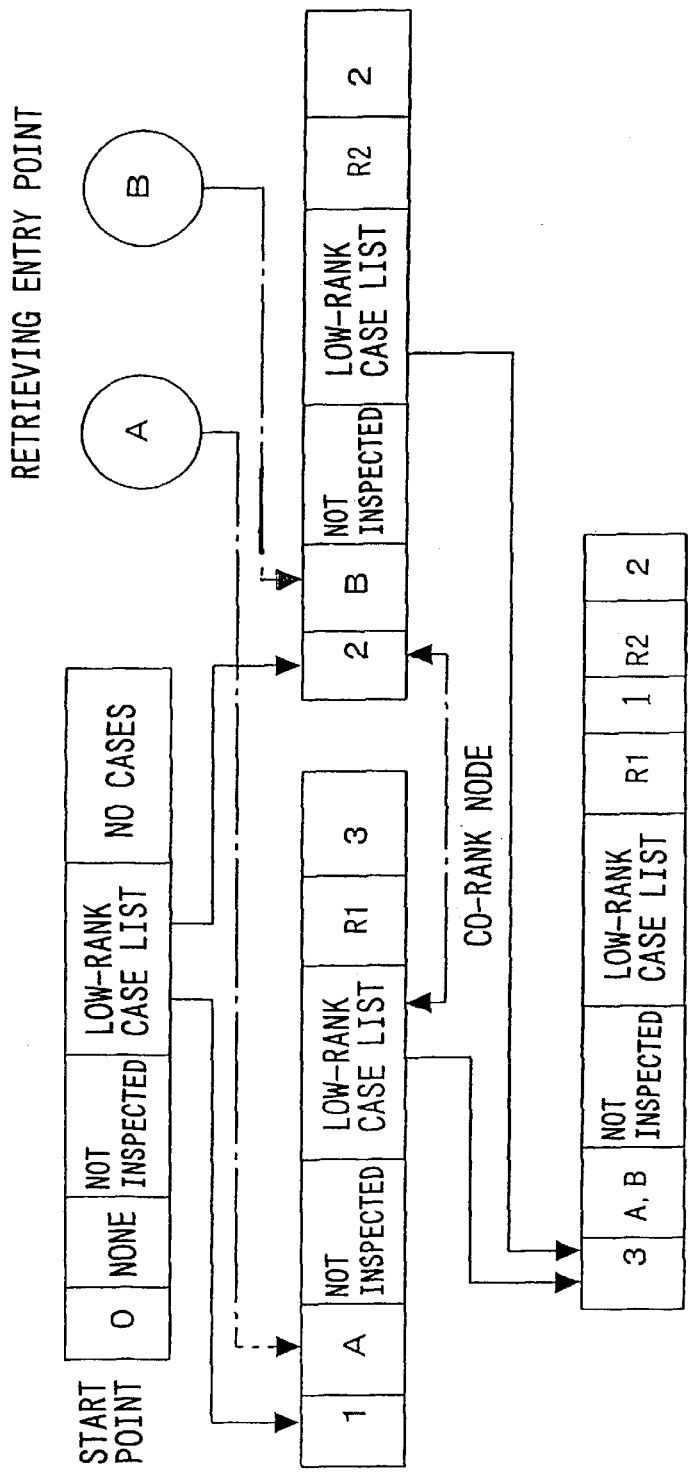
FIG. 4 illustrates an example of interconnected case nodes for illustrating the embodiments of the present invention.

Given a large number of cases, the case nodes are interconnected to constitute a network. FIG. 4 shows a connection example after the following cases are given:

TABLE 22

| Cases | Results of Classification | conditional part |
|---|---|---|
| humpback whale | Animal | live in water ∧ pulmonary respiration |
| dolphin | Animal | live in water ∧ pulmonary respiration |
| trout | Fish | live in water |
| sardine | fish | live in water |
| lungfish | fish | live in water ∧ pulmonary respiration |
| bear | animal | pulmonary respiration |
| cattle | animal | pulinonary respiration |

The case database is constructed at the same time as the interconnection of higher rank and low rank case nodes is updated as case data are entered. Given a certain condition and certain results of classification, the condition holding frequency and the holding frequency of the results of classification in known cases can be found efficiently, using this case database.

The sum of condition holding frequencies of case nodes lower than and including the case node E is termed "the total frequency of the conditions E" and the total frequency of holding of the results of classification R is termed the "total holding frequency of R under the condition E". The total condition holding frequency is the number of cases in case the conditions other than the condition of E are disregarded, while the total holding frequency of R is the number of cases in which the results R hold. These values may be stored in the case nodes.

<Retrieval Procedure of Negative Conditions>

Figure 5:
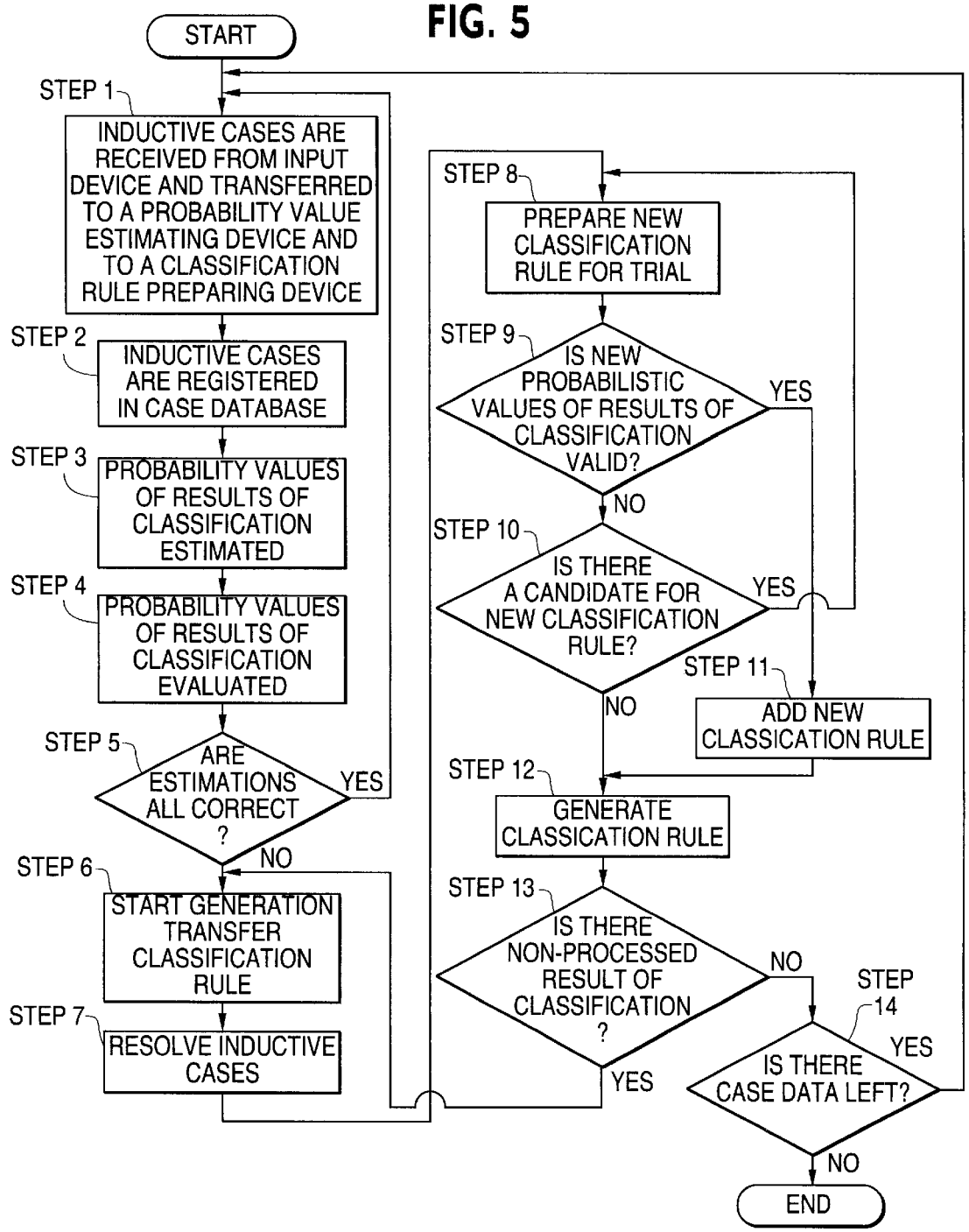
FIG. 5 shows an embodiment of a procedure of generating the classification rule according to the present invention.

Since the negative condition is not included in the inductive cases (a sole case operating as a clue to the generation of the classification rule) is not included in the inductive cases, as described above, it needs to be found by making retrieval in the case database. The illustrative sequence of operations, shown in FIG. 5, is now conceptually explained.

In retrieving the negative conditions, the results of classification R and the retrieving conditions C are checked. These represent the information sent from the classification rule generating device 101 to the negative condition search device 107 in the block diagram of the classification device shown in FIG. 2.

As the retrieving conditions,
1. conditions of inductive cases, and
2. conditions of the pre-existing classification rule used for automatically classifying inductive cases, etc. are given.

The affirmative condition for item 2 represents a sub-set of item 1, and has the effect of reducing the retrieval time. The negative conditions are retrieved using these retrieving conditions. In the following procedure, it is assumed that such classification rule for leading the results of classification R to a positive side at a higher probability is to be generated. If the classification rule for leading the results of classification R to a negative side at a low probability is to be generated, the concept of test (verification) or the probability value is to be reversed.

Retrieval proceeds toward low-rank ones of the case nodes including part of the retrieving conditions and not conflicting with the retrieving conditions, beginning from a case node with a small number of conditions. If, in a given case node, the following conditions are met, it is estimated that the negative conditions are included in this case node:

<Condition of Case Node Including Negative Conditions>

It is assumed that the total condition frequency of a case node E is n, the total holding frequency of the results of classification is s, the total condition frequency in a higher rank case node F with respect to E is m and the total frequency of holding of the results of classification R is t. If, foe certain F, t/m is sufficiently high, s/n is sufficiently low and there is a significant difference between t/m and s/n, the case node E is estimated to include a negative condition.

The difference between the condition D of the case node presumed to include the negative condition and the condition of an inductive case is the negative condition.

<Explanation Concerning Software Related Invention>

Figure 8:
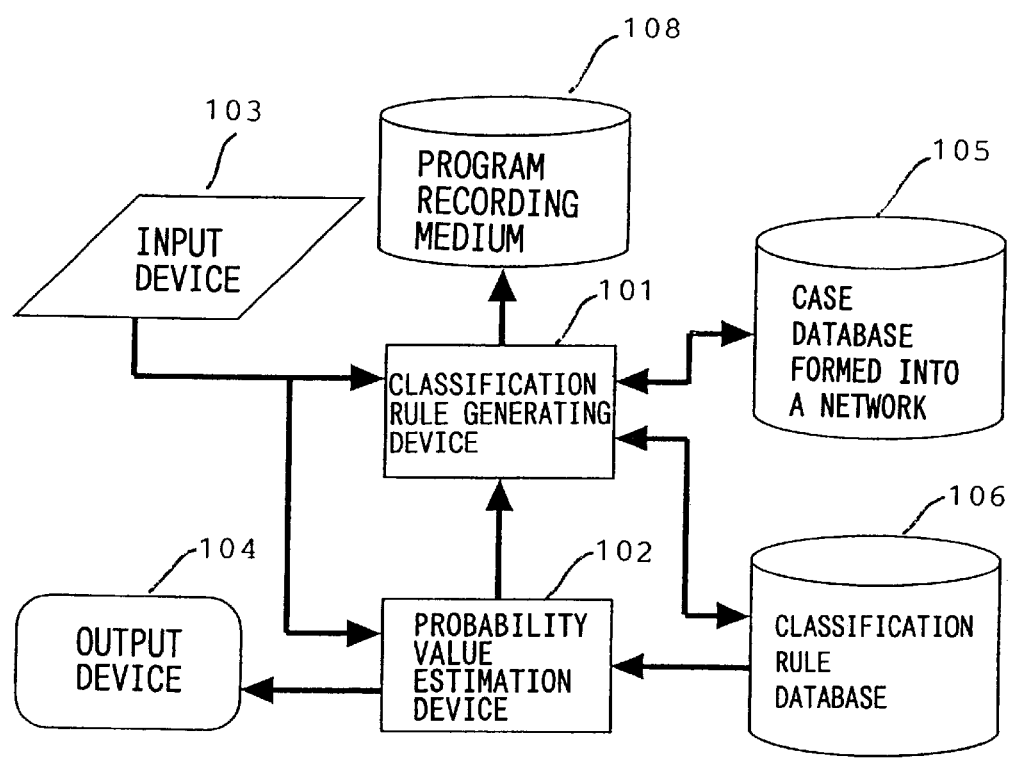
FIG. 8 is a block diagram of a classification device including a processing sequence recording medium according to the present invention.

FIG. 8 is a block diagram showing a classification apparatus including a processing sequence recording medium according to the fourth aspect. Referring to FIG. 8, the classification apparatus of the present embodiment includes, in addition to the configuration shown in FIG. 1, a processing sequence (program) recording medium 108, having a driving program for driving a classification rule generating device, recorded thereon. This program recording medium 108 may be a recording medium, such as a magnetic disc or a semiconductor memory. The classification rule generating device 101 relevant to the driving program for the classification rule generating device is implemented by a computer according to the fourth aspect.

The classification rule generating device driving program includes the processing sequence at the time of generating the classification rule, processing sequence at the time of automatic classification and the sequence of judging the validity of the rule, as previously explained. These sequences (programs) are read at the time of initialization of the classification device from the program recording medium 108 into a computer constituting the classification rule generating device 101 for execution.

Figure 9:
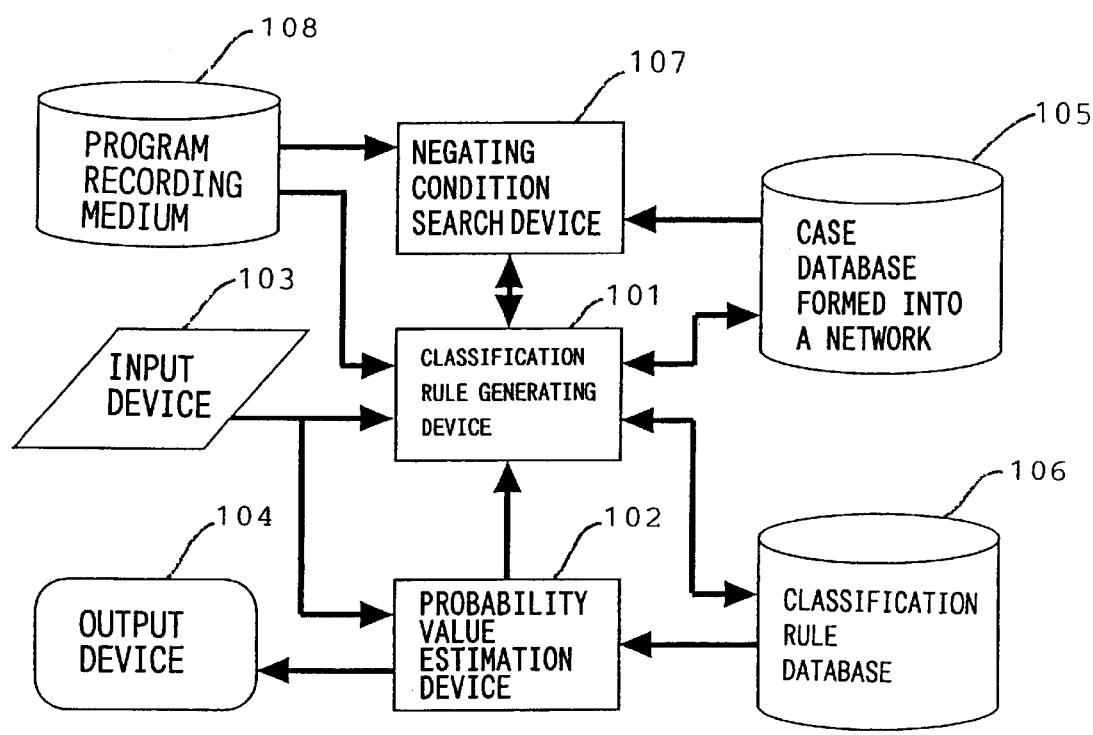
FIG. 9 is a block diagram of a classification device including a processing sequence recording medium according to the present invention.

FIG. 9 shows a block diagram of a classification apparatus inclusive of the processing sequence recording medium according to the fifth aspect. In FIG. 9, the classification apparatus of the present embodiment includes, in addition to the configuration shown in FIG. 2, a program recording 108, having a device driving program for driving a classification rule generating device, recorded thereon. This program recording medium 108 may be a recording medium, such as a magnetic disc or a semiconductor memory. The classification rule generating device 101 and the negative condition search device 107 relevant to the present device driving program is implemented by a computer according to the fifth aspect.

This device driving program includes the processing sequence at the time of generating the classification rule, processing sequence at the time of automatic classification, sequence of judgment of the validity of the rule, sequence of generating the classification rule having the negative conditions and the sequence of retrieving the negative conditions. Of these, the processing sequence at the time of generating the classification rule, processing sequence at the time of automatic classification, sequence of judgment of the validity of the rule and the sequence of generating the classification rule having the negative conditions are read from the program recording medium 108 to the computer of the classification rule generating device 101 at the time of initialization of the classification apparatus and executed by the above-described sequence of operations.

The retrieving sequence of the negative conditions is read at the time of initialization of the classification apparatus from the processing sequence recording medium to the computer constituting the negative condition search device 107 for execution by a procedure as explained previously.
Examples For further explaining the above-described embodiment of the present invention, examples of the present invention are hereinafter explained.

FIG. 1 is a block diagram showing the structure of a classification apparatus according to an example of the subject-matter according to the first aspect. FIG. 2 is a block diagram of an example according to the third aspect of the present invention. Referring to FIG. 1, the classification apparatus of the present example includes an input device 103 for entering known case data and unknown case data and a classification rule database 106 for storage of the classification rules containing the probabilistic information. The present embodiment also includes a case database 105 for forming the known case data into a network based on the logical relation of the conditional parts, and a probability value estimation device 102 for estimating the probability values of the results of classification using the conditional parts of the input known case data and unknown case data and the above-mentioned classification rule. The present embodiment further includes a classification rule generating device 101 for evaluating the validity of the classification rule by statistic test (verification) for suppressing wasteful generation of the classification rule, and an output device 104.

Referring to FIG. 2, the structure of FIG. 2 corresponds to the structure of FIG. 1 added to with a negative condition search device 107. The negative condition search device 107 has the function of accepting all or part of the conditional part of the input known case data as input and searching the case database in order to estimate case nodes including the negative condition. The classification rule generating device 101 has the function of generating the classification rule having the negative conditions using the negative condition search device 107.

The sequence of generating the classification rule in the clarification apparatus is hereinafter explained.

<Procedure of Generating Classification Rule>

FIG. 5 is a flow diagram showing an example of the procedure for generating the classification rule. The appellation of various parts of the apparatus correspond to that of the block diagram shown in FIG. 2. The present example corresponds to each of the first to third aspects. However, the example may be limited to one or more of these aspects, if so specified.

Step 1: A sole case data (inductive case) is received from the input device 103 and transferred to the classification rule generating device 101 and to the probability value estimation device 102.

Step 2: The classification rule generating device 101 adds inductive case to the case database 105.

Step 3: Using the probability value estimation device 102, the result of classification and the probability value thereof are found from the conditional part of the inductive case and the classification rule using the probability value estimation device 102.

Step 4: If, for each result of classification, the estimated probability value and the correct solution of the probability value are separated from each other by a value larger than a pre-set threshold value, the result of classification is judged to be beside the mark (incorrect). All results of classification beside the mark are all recorded in an "estimated result error list".

Step 5: If the estimation result error list is void, processing transfers to step 1 and, if otherwise, to step 6.

Step 6: The results of classification at the leading end of the estimation result error list represent the results of classification of the classification rules to be processed at steps 6 to 12. The classification rules used at the time of classification at step 3 are transferred from the probability value estimation device 102 to the classification rule generating device 101.

Step 7: The conditions of the inductive cases are resolved into individual condition units in order to generate a set of additional conditions S.

example: condition of an inductive case=live in water ˆ pulmonary respiration set of additional conditions S=live in water, pulmonary respiration.

Step 8: A new classification rule is prepared for trial. Namely, each condition which is an element of the set of additional conditions S is added to each classification rule to generate conditions of a new classification rule. An upper limit of the number of the conditions to be added is given from outside on startup of the device.

Step 9: The frequency of the conditional parts of the new classification rule and the frequency of the rule holding, generated at step 8, are found from the case database and, using the probability value p as found at step 3, validity of the new classification rule is judged by the statistic verification explained in the above-described embodiment of the present invention. If the new classification rule is valid, processing transfers to step11 and, if otherwise, processing transfers to step 10.

Step 10: If there is any new (candidate of) classification rule to be further generated is left, processing transfers to step 8 and, if otherwise, to step 12.

Step 11: The new classification rule is added to the classification rule database 106.

Step 12: Attempts are made to generate classification rules including the negative conditions.

Step S13: The leading end classification result of the error list of the classification result is removed. The classification result thus removed is the classification result of the classification rule in the processing from step 6 to step 13. If there is any element of the classification result error list left, processing transfers to step 6.

If any of case data is left, processing transfers to step 1 and, if otherwise, processing comes to END.

If the example is limited to the configuration of the first aspect, the following modification is made in the description in the above-described processing for generating the classification rules. The corresponding block views are of the illustrated configuration.

Modification:

Step 4: If the results of automatic classification are in error, all results of classification are recorded in the "error list of estimated results".

Step 12: this step is omitted.

In making judgment whether or not the results of automatic classification are in error, any of the following methods may be used:

The results of automatic classification are arrayed in the order of the decreasing probability values. If the first rank of the results is not coincident with the results of classification of the inductive cases, the results of automatic classification are judged to be in error.

The results of automatic classification are arrayed in the order of the decreasing probability values. If, in case where the first rank probability value exceeds a pre-set threshold value, and the second rank probability value is smaller than another pre-set (different) threshold value, the top rank is not coincident with the result of classification of the inductive cases, the result of automatic classification is judged to be in error.

If, in case where the probability values of the higher rank items, outputted as a result of the automatic classification, are normalized so that the sum total thereof is equal to unity, and the probability value of the top rank item exceeds a pre-set threshold value, the top rank result is not coincident with the result of the classification of inductive cases, result of classification is judged to be in error.

As for the first and second aspects, the following modification should be entered in the aforementioned sequence of generating the classification rule. The corresponding block diagram is shown in FIG. 1.

Modification:

Step 12: omitted.

<Procedure of Generating Classification Rule Including Negative Conditions>

This is the sequence of generating the classification rule of the classification rule generating apparatus according to the third aspect.

Figure 6:
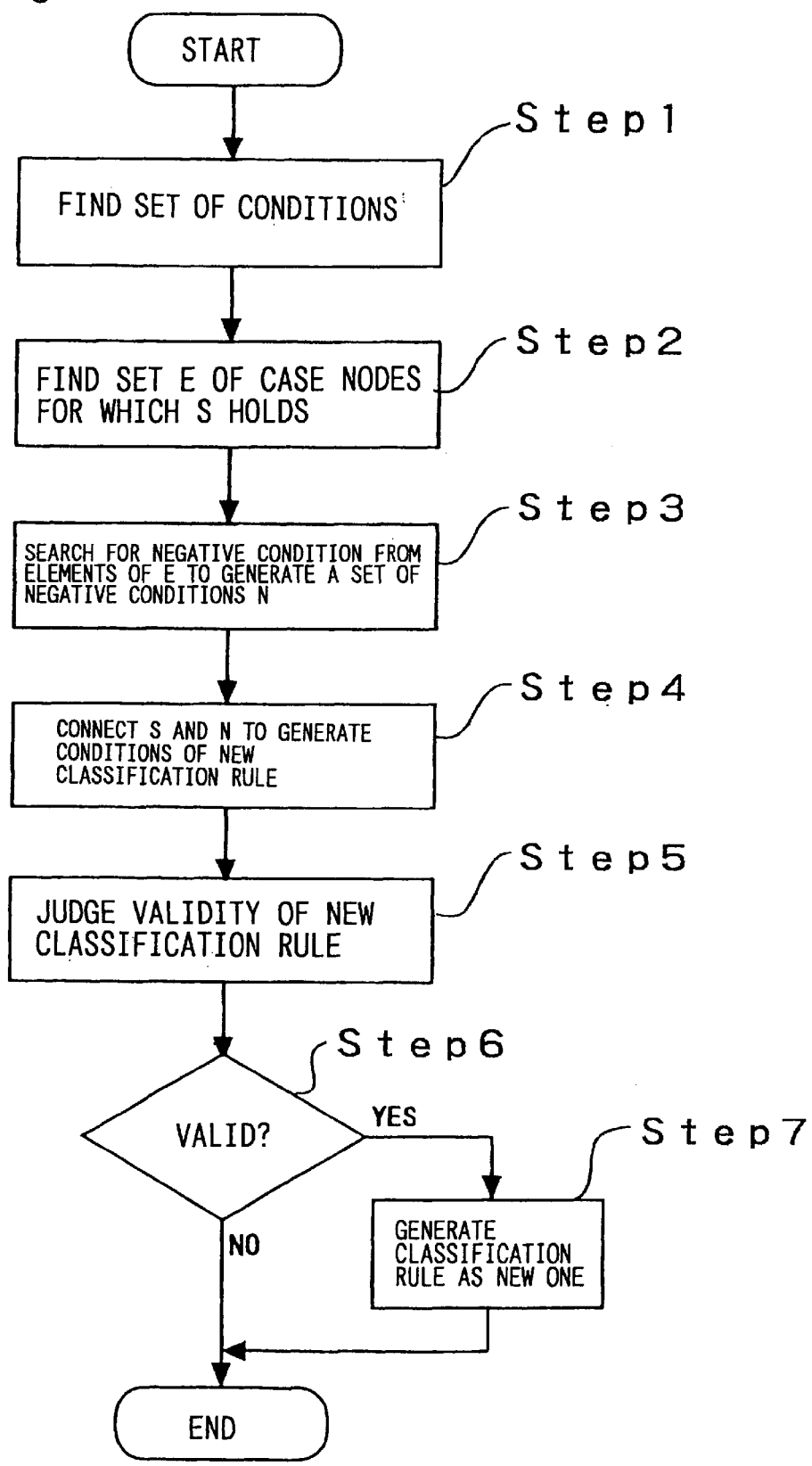
FIG. 6 shows an embodiment of a procedure of generating classification rule including the negative condition according to the present invention.

FIG. 6 shows an example of the procedure for generating the classification rules including the negative condition. This figure shows a flow diagram showing an example of the procedure used at step 12 of FIG. 5.

Step 1: All conditions of the classification rule having undesirable probability values are collected from among the classification rules used for automatic classification, to form a set of conditions S.

The classification rule having an undesirable probability value is defined as follows:

1. a classification rule having a probability value significantly smaller than a pre-set threshold value if the classification rule is ones that would lead to a correct classification result; and 2. a classification rule having a probability value significantly larger than a pre-set threshold value if the classification rule is ones that would lead to an incorrect classification result.

Step 2: All case nodes that enable the set of conditions S to hold logically are collected to provide a set of cases E.

Step 3: For each of the case nodes, as elements of E, it is estimated whether or not a negative condition is included, and the resulting negative conditions are accumulated in a set of negative conditions N.

This estimating method is explained in the above-described embodiment of the present invention.

Step 4: To the set of conditions S is added the above-described set of negative conditions N to provide a conditional part of a new candidate for the classification rule h.

Step 5: The new classification rule candidate h is judged as to validity by statistic verification. At this time, the frequency of the condition holding and the frequency of rule holding are found from the case database.

Step 6: If the candidate h is valid, the candidate h is generated as a classification rule.

Figure 7:
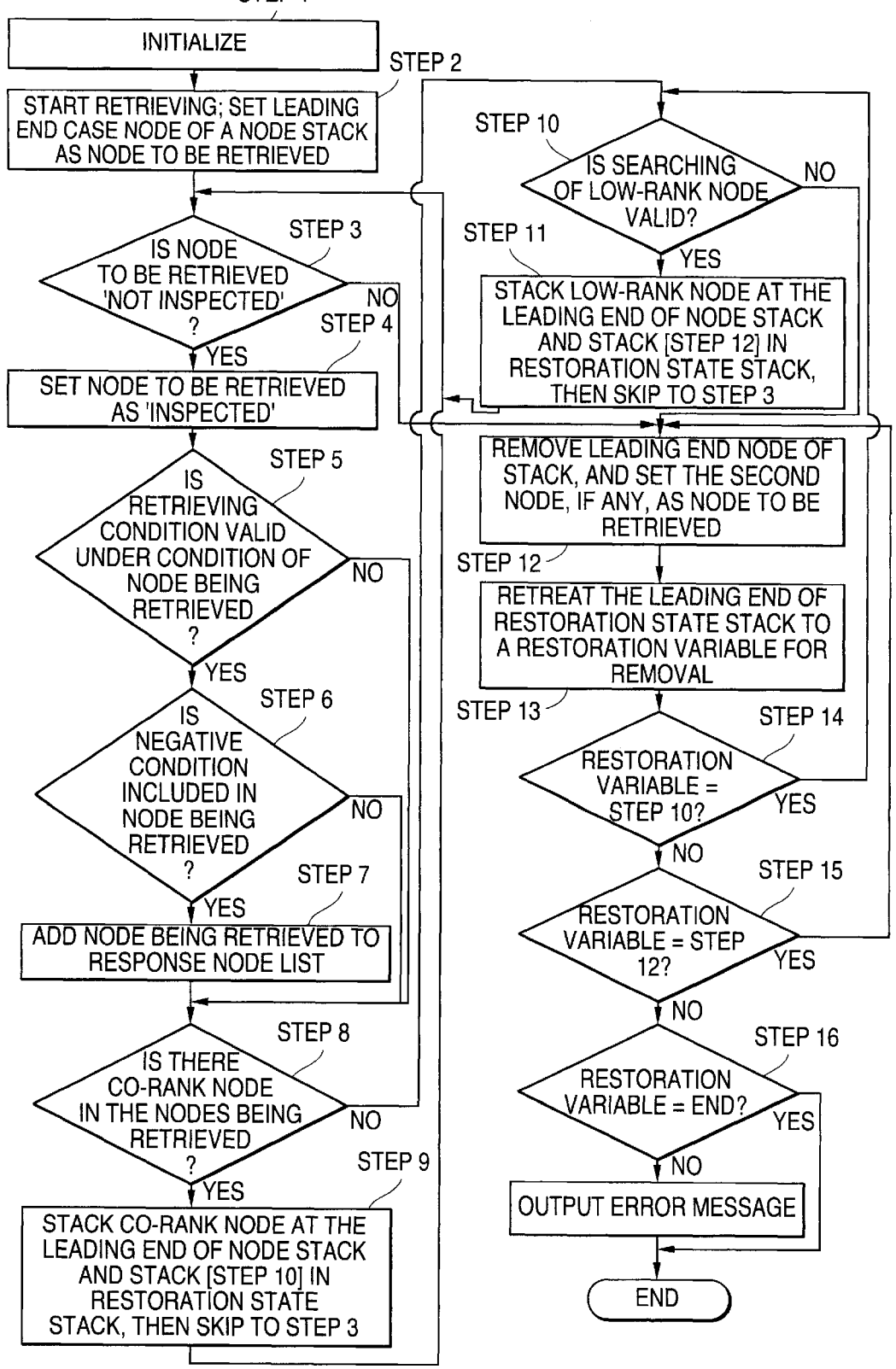
FIG. 7 shows an embodiment of a procedure of searching case nodes including the negative condition according to the present invention.

FIG. 7 is a flow diagram showing an embodiment of the search procedure for a negative condition. This is also a "procedure for generating the classification rule including the negative condition" and the case node search sequence used in step 2 of FIG. 6.

Referring to FIG. 7, the search condition and the results of classification are given at the start time point. The terms used in FIG. 7 have the following meaning:

Node stack: Stack for transiently storing case nodes of an object of retrieval. It is sometimes simply termed "stack". In general, a stack is a first-in last-out type memory device.

Restoration state stack: A stack operatively associated with a stack and specifying from which step to start processing when processing of the leading node of the node stack is terminated and the next case node is processed.

Reply node list: A list of case nodes returned by the retrieval sequence as a response.

Step 1: By way of initialization, the retrieval conditions are resolved on the individual condition basis and case nodes of the entry points of the respective conditions are sequentially stacked in the node stack. When the first case node is stacked, "end" is stacked in the restoration state stack. As from the next case node, "step 2" is stacked once in the restoration state stack at the same time as a case node is stacked.

Step 2: retrieval is started. The leading case node of the node stack is provided as a retrieved node.

Step 3: it is checked whether or not the node being searched is in a "non-inspected" state. If the node is in the non-inspected state, processing transfers to step 4, and if otherwise to step 12.

Step 4: The node being searched is to be "already inspected".

Step 5: It is checked whether or not the retrieval condition holds on the basis of the node being retrieved. If the retrieval condition holds, processing transfers to step 6 and if otherwise to step 8.

Step 6: It is checked whether or not the node being retrieved contains a condition which can serve as a negative condition. If the result is YES, processing transfers to step 6, and if otherwise, to step 8.

Step 7: a node being retrieved is added to a reply node list.

Step 8: It is judged whether or not a co-rank node exists in the node being retrieved. If the result is YES, processing transfers to step 9 and, if otherwise, to step 10.

Step 9: A co-rank node is stacked in the leading end of a stack, and a "step 10" is stacked in the restoration state stack. Then, processing skips to step 3.

Step 10: If the total frequency of the conditions of the node being retrieved is smaller than a pre-set threshold value, the low-rank node is not searched. If the co-rank node is searched, processing transfers to step 11 and, if otherwise, to step 12.

Step 11: The low-rank node is stacked at the leading end of the node stack. On the restoration state stack is stacked "step 12" before processing skips to step 3.

Step 12: The leading end node of the stack is removed. If, as a result, there is the second case node, this is to be the leading end of the stack and simultaneously is to be the node being retrieved.

Step 13: The leading end of the restoration state stack is receded to a restoration variable and the leading element is removed.

Step 14: If restoration variable="step 10", processing skips to step 10.

Step 15: If restoration variable="step 12", processing skips to step 12.

Step 16: If restoration variable="end", processing skips to end.

It should be noted that modification obvious in the art may be done without departing the gist and scope of the present invention as disclosed herein and claimed hereinbelow as appended.

What is claimed is:

1. A classification apparatus in which classification rules are automatically generated using known case data, having known results of classification, among case data each of which is made up of a set of a conditional part serving as a clue for classification and a result of classification, and in which unknown case data, having unknown results of classification, are automatically classified using said classification rules; comprising:

(a) an input unit for entering the known case data and the unknown case data;

(b) a classification rule database for storing classification rules including probabilistic information;

(c) a case database for storing the known case data in the form of a network based on the logical relation of the conditional parts;

(d) a probability value estimating unit for estimating probability values of the results of classification using the conditional parts of the known case data and the unknown case data as entered and the rules of classification;

(e) a classification rule generating unit for evaluating the validity of the classification rules received from the classification rule database and the case database by statistic verification for suppressing generation of useless classification rules, and generating a valid classification rule, wherein the generated valid classification rule comprises at least a value indicating a frequency of the validity of the conditional part; and (f) an output unit for outputting the generated classification rule, wherein the generated classification rule is used to classify the unknown case data.

2. The classification rule generating apparatus as defined in claim 1 wherein the probability value output from said probability value estimating unit and is the result of classification of said known case data entered from said input unit, and is compared with the probability value of the result of classification output by said probability value estimating unit for generating the classification rule if the difference exceeds a pre-determined value.

3. The classification rule generating apparatus as defined in claim 1 further comprising:

negative condition searching means for receiving all or part of the conditional parts of the known case data as entered into said input unit, said negative condition searching means searching in said case database for inferring case nodes which include the negative conditions;

said classification rule generating means having an added function of generating a classification rule including the negative condition using the negative condition searching means.

4. A recording medium having recorded thereon a program to be executed by a computer, said program comprising:

(a) processing of generating a new classification rule on the entered known case data from the classification rule database in the classification apparatus as defined in claim 1, and (b) processing of evaluating rule validity by statistic verification for suppressing generation of wasteful rules.

5. A recording medium having recorded thereon a program to be executed by a computer as defined in claim 4, wherein said program comprises:

(a) processing of searching said case database using all or part of the entered known case data in the recording medium for inferring case nodes including the negative condition by way of negative condition retrieving processing, and (b) processing of generating a classification rule including a negative condition inferred by said searching processing of said negative condition by way of generating the classification rule having the negative condition.

6. A computer system in which classification rules are automatically generated using known case data, having known results of classification, among case data each of which is made up of a set of a conditional part serving as a clue for classification and a result of classification, and in which unknown case data, having unknown results of classification, are automatically classified using said classification rules; comprising:

an input unit for entering the known case data and the unknown case data;

a classification rule database for storing classification rules including probabilistic information; and a case database for storing the known case data in the form of a network based on the logical relation of the conditional parts;

a recording medium having recorded thereon a program for allowing the following means to function on said computer system:

(a) means for estimating probability values of the results of classification using the conditional parts of the known case data and the unknown case data as entered and the rules of classification; and (b) means for evaluating the validity of the classification rules by statistic verification to suppress generation of useless classification rules;

(c) means for generating classification rules using said known case data and said unknown case data, wherein the generated classification rules comprises at least a value indicating a frequency of the validity of the conditional part;

(d) an output unit for outputting the classification rules, wherein the generated classification rule is used to classify the unknown case data.

7. A computer system in which classification rules are automatically generated using known case data, having known results of classification, among case data each of which is made up of a set of a conditional part serving as a clue for classification and a result of classification, and in which unknown case data, having unknown results of classification, are automatically classified using said classification rules; comprising:

an input unit for entering the known case data and the unknown case data;

a classification rule database for storing classification rules including probabilistic information; and a case database for storing the known case data in the form of a network based on the logical relation of the conditional parts;

a recording medium having recorded thereon a program for allowing the following means to function on said computer system:

(a) means for estimating probability values of the results of classification using the conditional parts of the known case data and the unknown case data as entered and the rules of classification;

(b) negative condition searching means for receiving, as input, all or part of the conditional parts of the known case data as entered, and (c) classification rule generating means for evaluating the validity of the classification rules by statistic verification to suppress generation of useless classification rules, and generating a valid classification rule, wherein the generated valid classification rule comprises at least a value indicating a frequency of the validity of the conditional part; and said negative condition searching means searching in said case database for inferring case nodes which include the negative conditions, said classification rule generating means having the function of generating the classification rule including the negative condition using said negative condition searching means; and (f) an output unit for outputting the classification rules, wherein the generated classification rule is used to classify the unknown case data.

* * * * *